(12) United States Patent
Kuehnel et al.

(10) Patent No.: US 11,683,299 B2
(45) Date of Patent: Jun. 20, 2023

(54) SEMI-INTERACTIVE ONE-WAY TRANSFER OF DATA TO AN ISOLATED NETWORK

(71) Applicant: Oracle International Corporation, Redwood Shores, CA (US)

(72) Inventors: Thomas Werner Kuehnel, Seattle, WA (US); Joseph Neil Garfinkel, Raanana (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2 days.

(21) Appl. No.: 17/195,466

(22) Filed: Mar. 8, 2021

(65) Prior Publication Data

US 2022/0286441 A1 Sep. 8, 2022

(51) Int. Cl.
*H04L 9/40* (2022.01)
*H04L 9/32* (2006.01)
*H04L 47/33* (2022.01)
*H04L 65/60* (2022.01)
*H04L 49/9005* (2022.01)

(52) U.S. Cl.
CPC ........ *H04L 63/0457* (2013.01); *H04L 9/3213* (2013.01); *H04L 9/3226* (2013.01); *H04L 9/3247* (2013.01); *H04L 63/08* (2013.01); *H04L 63/12* (2013.01); *H04L 47/33* (2013.01); *H04L 49/9005* (2013.01); *H04L 65/60* (2013.01)

(58) Field of Classification Search
CPC . H04L 63/0457; H04L 9/3213; H04L 9/3226; H04L 9/3247; H04L 63/08; H04L 63/12; H04L 47/33; H04L 49/9005; H04L 65/60
See application file for complete search history.

(56) References Cited

U.S. PATENT DOCUMENTS

| 7,765,316 B1 * | 7/2010 | Huckins | H04L 12/1881 709/217 |
|---|---|---|---|
| 9,510,363 B2 * | 11/2016 | Goteti | H04W 72/1268 |
| 2009/0037581 A1 * | 2/2009 | Richardson | H04L 67/14 709/227 |
| 2014/0068704 A1 * | 3/2014 | Grewal | G06F 21/85 726/4 |
| 2017/0171220 A1 * | 6/2017 | Thomson | H04L 63/0227 |
| 2019/0124031 A1 * | 4/2019 | Trudeau | H04L 63/00 |
| 2019/0245894 A1 * | 8/2019 | Epple | G06F 21/56 |

* cited by examiner

*Primary Examiner* — Henry Tsang
(74) *Attorney, Agent, or Firm* — Kilpatrick Townsend & Stockton LLP

(57) ABSTRACT

The present embodiments relate to providing near real-time communications from a public network to a private network. A first computing device in a public network can obtain data packets to be provided to the private network from an application executing on the first computing device. A trust module executed by the first computing device can authenticate the user, application, and the data packets to be provided to the private network and add metadata relating to the sending user, recipient user, etc. The data packets can be forwarded to the private network via a cross-domain system (CDS). The metadata and the digital signature on the data packets can be verified by a trust module executing on a second computing device in the private network. The second computing device can receive the data packets and store the data packets for subsequent actions to be performed in the private network.

22 Claims, 9 Drawing Sheets

SEMI-INTERACTIVE ONE-WAY TRANSFER OF DATA TO AN ISOLATED NETWORK

BACKGROUND

A network environment can include multiple network types within the environment. For example, a network environment can include both a public network and an isolated (e.g., private) network. The public network can allow for data communication between devices in the public network and allow for access to external public networks (e.g., the Internet). While devices in the public network can utilize various methods to increase data security, devices and the transmission of data within the public network can be at risk of unauthorized access. For example, a device in the public network can obtain malware, leading to unauthorized access to the device or data transmitted by the device.

Further, in many instances, entities (e.g., a cloud computing platform) can have portions of data that are to be securely maintained with limited access to that data. Accordingly, such data can be maintained in a private network isolated from the public network and accessible only to authorized users. An administrative user can securely access the private network and maintain/update core components in the private network.

Providing data to the private network may only be allowed via a one-way data communication from an authorized device in the public network to a device in the private network. For example, an administrator can log into a computer on the public network, provide login credentials as an administrator, and provide the data to be provided to the private network.

The data can first be processed by an intermediary system, such as a cross domain system (CDS), prior to being received at the private network. However, data processing can be lengthy (e.g., a multi-hour delay), resulting in delayed receipt of data at the private network. Additionally, the data to be sent to the private network may have to be manually entered by character by an operator with access to the private network, resulting in an increased risk of errors in the data provided to the private network. Such features may result in a poor user experience in interacting with devices in the network environment and performing tasks with the private network.

SUMMARY

The present embodiments relate to secure one-way transmission of data from a public network to a private network. A first exemplary embodiment provides a method. The method can include obtaining a stream of data packets. A first computing device in the public network can obtain the stream of data packets. The method can also include forwarding the stream of data packets and user information associated with a sending user to a first instance of a trust module executing on the first computing device. The method can also include adding metadata to the stream of data packets. The metadata can include a digital signature generated from a private key specific to the first instance of the trust module and information relating to the user identification, a first application providing the stream of data packets, and a recipient, i.e. user on the private network. The method can also include forwarding the stream of data packets to a second computing device in the private network via a cross-domain system (CDS). The second computing device can be configured to process the metadata of the stream of data packets to verify the identity of the sending user by verifying the digital signature relating to the first instance of the trust module. The signature validation can be performed using the corresponding public key of the private key used for signing.

Another exemplary embodiment relates to a system. The system can include a first computing device in a public network. The first computing device can include a first processor and a first non-transitory computer-readable medium. The first non-transitory computer-readable medium can include instructions that, when executed by the first processor, cause the first processor to obtain a stream of data packets from a first application executing on the first computing device. The first non-transitory computer-readable medium can further cause the first processor to pass the stream of data packets to a first instance of a trust module executing on the first computing device.

The first non-transitory computer-readable medium can further cause the first processor to add metadata to the stream of data packets. The metadata can include a digital signature generated from a private key specific to the first instance of the trust module and information relating to user information provided to the first instance of the trust module, the first application, a sending user, and a recipient user. The first non-transitory computer-readable medium can further cause the first processor to forward the stream of data packets to a cross-domain system (CDS) providing one-way communication of data from the public network to a private network.

Another exemplary embodiment relates to a non-transitory computer-readable medium including stored thereon a sequence of instructions. The instructions, when executed by a processor causes the processor to execute a process. The process can include obtaining, by a first computing device in a public network, a stream of data packets from a first application executing on the first computing device. The process can also include passing, by the first computing device, the stream of data packets to a first instance of a trust module executing on the first computing device. The process can also include adding, by the first instance of the trust module executing on the first computing device, metadata to the stream of data packets. The metadata can be used for validation and auditing to assure the sender, recipient, and applications are not tempered with.

The process can also include forwarding, by the first computing device, the stream of data packets to a second computing device in a private network via a cross-domain system (CDS) providing secure one-way communication of the stream of data packets from the public network to the private network. The second computing device can be configured to process the metadata of the stream of data packets to verify an identity of a sending user and verify a digital signature relating to the first instance of the trust module in the metadata in the stream of data packets. The second computing device can be configured to receive the stream of data packets in a receive buffer maintained by the second computing device responsive to verifying the identity of the sending user and verifying the digital signature. Identification can be done on a per session basis or on a per packet basis.

DETAILED DESCRIPTION

Figure 1A:
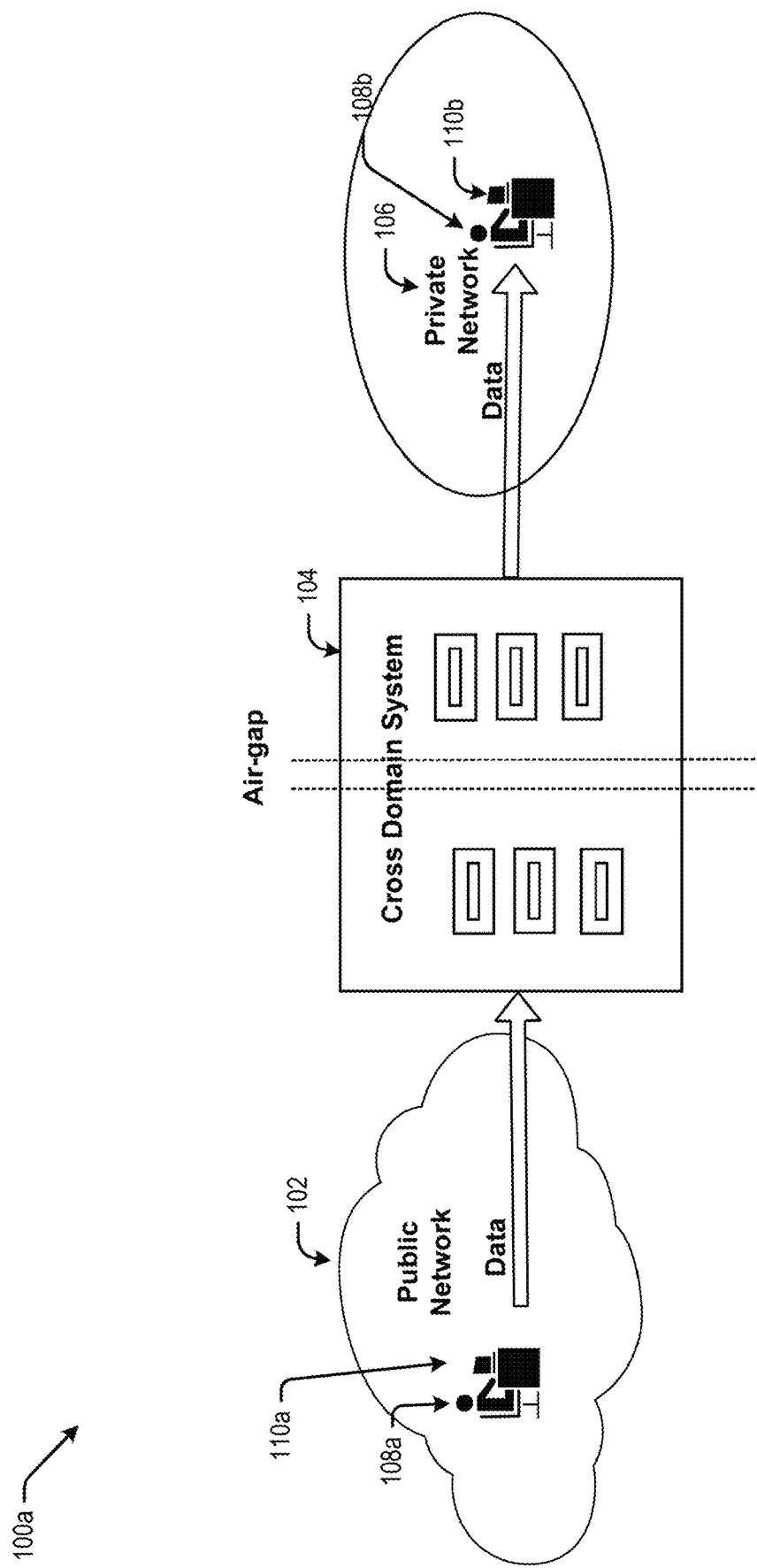
FIG. 1A illustrates a block diagram of a network environment including both a public network and a private network, according to at least one embodiment.

The present embodiments relate to providing near real-time communications from a public network to a private (or isolated) network. A first computing device in a public network can obtain data packets to be sent to the private network from an application executing on the first computing device. A trust module executed by the first computing device can authenticate the user, application, and the data packets to be provided to the private network and add metadata relating to the sending user, recipient user, etc. The trust module can also add a digital signature to the data packets to assure the integrity of sending user, recipient and application. The signature can be generated from a private key that has a corresponding public key on the private network. In some embodiments, the data can be signed with a public key and the signature can be validated by a private key present on the private network. A combination of public and private keys can be configured for both entities to assure integrity between the trust modules on the public and private networks.

The data packets can be forwarded to the private network via a cross-domain system (CDS). The CDS can obtain the data packets and store the data packets in a dynamic buffer unique to a session established between a sending user and a recipient user in the private network. The CDS can also log the data packets and metadata for subsequent auditing of all data being provided to the private network. The metadata and the digital signature on the data packets can be verified by a trust module executing on a second computing device in the private network. The second computing device can receive the data packets and store the data packets for subsequent actions to be performed in the private network, such as to update a core component of a network environment, for example.

The present embodiments can provide a path for digital content (e.g., data packet) transfer to a private region of a network environment with a lowered delay in receipt of the digital content while providing increased data security, compliance, and audit requirements. Further, the transfer of content can have a reduced communication delay (e.g., seconds or milliseconds) to the private network over the delay provided by other techniques (e.g., hours) to provide efficient near real-time operations support.

The present embodiments can also provide support of operations to forward data packets to a private network via an ingress channel that may not be supported in existing channels. In many cases, other ingress channels can be designed for low frequency digital artifacts that carry significant administrative overhead and a great transfer time across an air-gap. For example, the time to receive data at a private network in many general channels can be measured from minutes to hours, which can prevent the channel being used for near real-time communication required to support operations use cases. Accordingly, supporting operations where high frequency and highly time-sensitive digital artifacts need to be transferred in near real time may be difficult and inefficient.

The present embodiments can create a prioritized channel in a cross domain system (CDS) that comprises a boundary between a private network and a public network. The prioritized channel can allow for expedited processing of data forwarded to the private network to reduce latency in receipt of content at the private network. The data packets provided at a device at the public network can be converted into a data type capable of being processed by the CDS (e.g., scanned and analyzed). For example, the data can be converted into a file using a specific data type (e.g., ASCII). The files can be formatted to allow the CDS to filter the data and avoid covert transmission of data across the CDS.

The present embodiments can allow for authorization of users, applications, and devices providing the data packets to be transmitted to the private network to increase data security. Further, all data transmitted to the private network can be logged for subsequent auditing. Individual data can be logged on a per packed basis and/or session basis. A session can include a user on the public network side initiating a data transfer to a user on the private network side using a specific application. All packets transferred within this context can be associated with the session. Activity, Volume or time limitations can be imposed for a session.

Rather than having to provide content in-line to the private network, the present embodiments can provide a platform that can allow for content to be written or copied into an application on a device in the public network prior to being transmitted to the private network via the CDS. This can reduce errors in the content being transmitted across the network and increase efficiency in providing content to users on the private network. Users on the private network can further process the information such as copying/pasting into command-line or user experience (UX) tools.

In some embodiments, the platform for providing the content can include a one-way clipboard. The clipboard can allow for the user to enter information by typing data or copying data from another source. Responsive to a portion of data being completed (e.g., a user selecting an 'enter' command), the content can be converted into a file and forwarded to the CDS for transmission to the private network as described herein. Another example platform for providing content can include a chat application. For example, a chat application can obtain text content and convert the data into a file to be sent to the private network via the CDS.

In some embodiments, a ticketing system can create tickets to track/log content being forwarded across the CDS. A ticketing system (e.g., JIRA) can be used to enter a ticket for each portion of content being forwarded across the CDS. The ticket can be duplicated into a file and sent to the private network where a new ticket is created on a local instance of a ticketing system within the private network. The ticketing system can assist in tracking/logging content across the network and subsequent auditing of data, as described herein.

FIG. 1A illustrates a block diagram of a network environment 100 including both a public network 102 and a private network 106. The public network 102 can include an electronic communication network allowing data transfer between devices locally across a network (e.g., a local area network (LAN)) and/or across external networks (e.g., devices connected via the Internet). The private network 106, on the other hand, can include a network that is isolated from external networks except for only authorized devices and networks. In many instances, secure data can be stored in the private network 106 and core administrative tasks to the network environment (e.g., a cloud computing platform) can be executed in the private network 106. Accordingly, only authorized users may be access the private network and data transferred from the public to the private network may have to be authorized. For example, the private network 106 may only allow a sending user 108a interacting with a first computing device 110a to provide one-way data communication to a recipient user 108b interacting with a second computing device 110b in the private network 106 via a CDS 104.

Digital content (e.g., scripts, documents, internet content, instant messaging content, JIRA tickets, identifiers) obtained by devices in the public network 102 can be encapsulated into a format allowing for automated analysis of the content by the CDS 104. The content can be converted into data packets comprising a format allowing the CDS 104 to analyze the data for any authorized features. The formatted data can be provided to the CDS 104 that can process the data based on requirements specific to the CDS 104 to ensure that the data is valid and secure (e.g. does not contain malware). The CDS 104 can include built in filters and permissible formats that allow for maximizing data transfer efficiency while also maintaining security of data transmitted to the private network.

A sending user 108a interacting with a first computing device 110a on the public network 102 can prepare data for transfer to the private network 106. The sending user 108a can interact with a source application executing on the first computing device 110a to obtain or generate the content to be provided to the private network 106. The content can be forwarded to the CDS 104 with a high priority to send the data on an expedited/prioritized channel. In some embodiments, the transfer of other data can be paused to decrease latency of the prioritized content.

The CDS 104 can verify the digital signature on the content and analyzes the content before delivering the content to an application running on a device in the private network. A receiving user interacting with a device in the private network 106 can obtain the content and perform subsequent actions using the content (e.g., update core infrastructure settings using the received content).

Figure 1B:
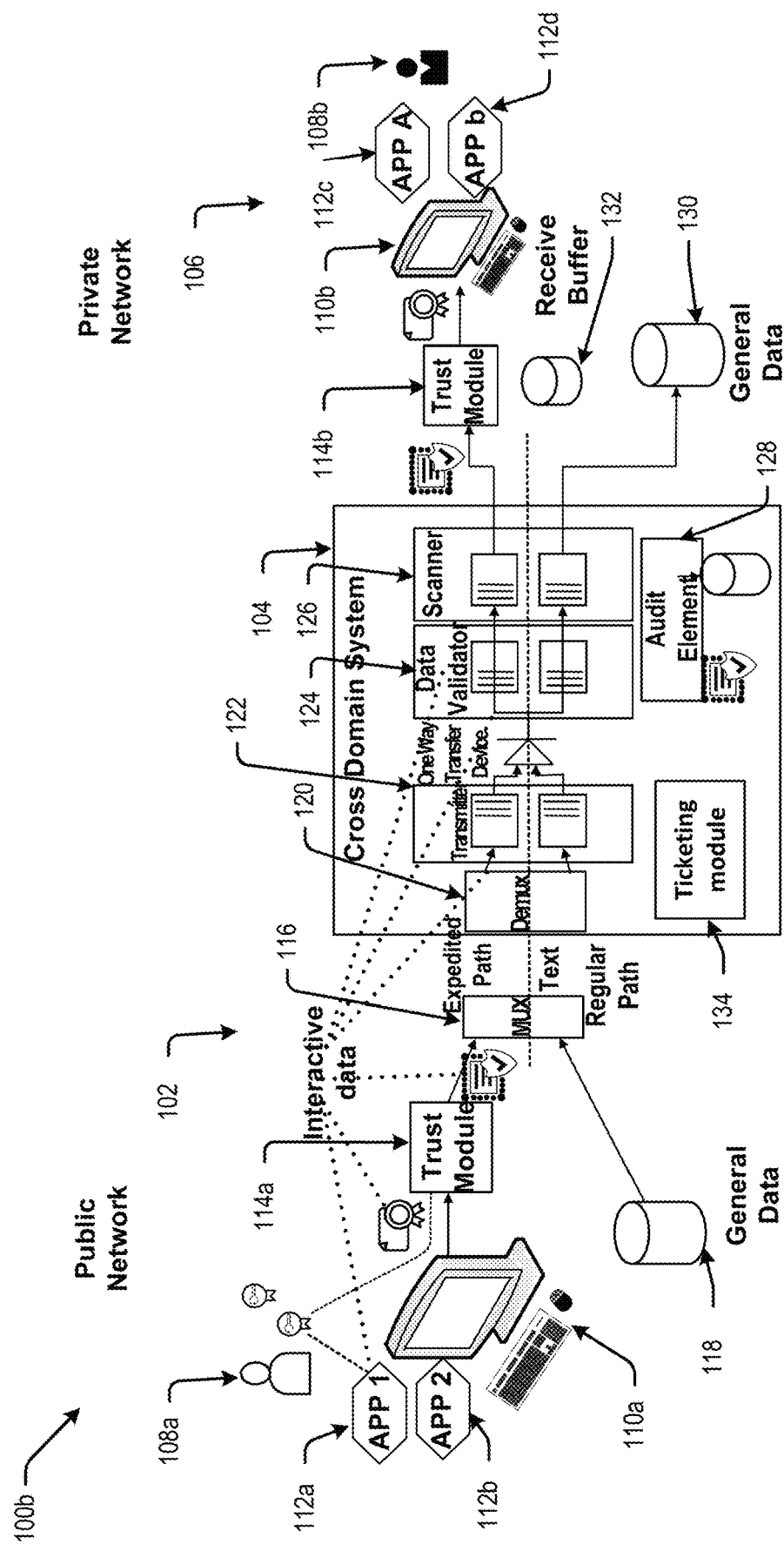
FIG. 1B illustrates a detailed block diagram of a network environment for securely transmitting data one-way from a public network to a private network, according to at least one embodiment.

FIG. 1B illustrates a detailed block diagram of a network environment 100 for securely transmitting data one-way from a public network 102 to a private network 106. The users 108a-b on both the public network 102 and private network 106 can use applications 112a-d executing on computing devices 110a-b to forward data packets from the public network 102 to the private network 106 via a CDS 104. For example, a sending user 108a on the public network 102 can provide content to a clipboard application or a command line tool and send the content to the private network 106 via the CDS 104. In other embodiments, an application (e.g., 112a) can include a ticketing application or a chat application for generating content to be sent to the private network 106. The application 112a, 112b can allow for a user to create, store, and retrieve content in a trusted manner. The sending user 108a can log into the application 112a, 112b using login credentials that can run locally on a computer or remotely on a trusted web server, for example.

A first application (e.g., APP 1 112a) can process information from a second application (e.g., APP 1 112b) into a file that can be scanned and sent to the private network 106 as described herein. The first application 112a can ingest data from the second application 112b, such as a chat application, and process the data into a compliant format. The second application 112b can then only need to know the destination of the data packets and a user sending the data without knowing how to transmit the data across the CDS 104 to ensure data security.

The application 112a-d can be executed locally on a computing device or hosted on a web service. A user can log into the application 112a-d with their credentials, and the application can verify the credentials with an authentication server. In some embodiments, a two-factor authentication can be executed to authenticate and authorize the user. Responsive to the user being authenticated and authorized, the user may select a recipient user which the application can verify as a valid user 108b. For example, the application can display lists of users to select the recipient user. The receiving user can log into an application on the private network and verify the content to receive the content. Another embodiment can store the content in a dedicated storage area for the user similar to a mailbox. Once the user logs on to the application the content can be automatically retrieved and presented to the user.

Devices in the private network and public network can include trust modules (114a-b) that allow for establishing a trust relationship between a sending user in the public network and a receiving user in the private network. For example, a first instance of a trust module 114a can query for user credentials and verify the credentials prior to allowing content to be forwarded to the CDS 104.

The trust module 114a-b can ensure security of users interacting with the private network and security of data provided to the private network. For example, the trust module 114a can assure that the sending user is an authorized user that is authorized to provide data. The trust module 114a can also assure that the data source (e.g., the computing device in the public network and the application providing the content) are authenticated and the data is not tampered with or injected by any third party user/device. The trust module can also assure that the receiving device 110b is authenticated as well. In some embodiments, the trust module can track applications and content being provided to the private network. The trust module 114b can manage a receive buffer 132 at the public network 102 and manage a session between the computing devices in the public network and private network. A session in this context can be characterized by communication peers (i.e. users 108a, 108b), computing devices 110a, 110b, and applications 112a-d and defined with an explicit start and stop. All data transferred within the context of a session can be analyzed by the CDS 104 in its entirety.

The trust module 114a-b can authenticate applications and data using Public-Private key pairs. The trust module 114a on the public network can receive data packet(s) from an application and verify that the application is approved to transmit secure data to the private network. User information (e.g., a username, user login credentials) can be provided with the data packets. The user can log into an application and the application can forward a token to the trust module to authenticate the user.

The user 108a in the public network 102 can specify a recipient user 108b in the private network 106. The trust module 114a can add metadata to the data packets, identifying a sending user, recipient user, an application originating the packets, and establish a session identifier etc.

The system can establish a session between the computing devices in the private network and the public network. The session can be established explicitly by an indication to establish the session or implicitly with the addition of the metadata. The session may be limited only to devices associated with the sending user and the recipient user and may include a limited time duration (e.g., the session ends after a time duration or a threshold inactivity time). In subsequent packets, it may be sufficient to transmit the session identifier in lieu of user, application etc. The session identifier can include a randomly generated identifier such as a universally unique identifier (GUID) used in computer systems.

The trust module can verify that various conditions are met and then sign the packet with a private key. The trust module can send the content to the expedited path of the CDS. Following analysis of file content and signature the CDS can pass the data to the trust module on the private network side. The data can be inspected and stored in a dynamic buffer created for the session. The data can then be forwarded to the recipient user and an application on the private network. The trust module can first authenticate the identity of the user and authenticate the application prior to receiving the content from the buffer.

In some embodiments, a file type such as JSON or XML can be used as a file type for the data packets to be forwarded to the CDS rather than a linkage to an application. The file format can meet various criteria, such as a data size and encoding type criteria, for example. The trust module can identify whether the content is within specified criteria. In some embodiments, the content can be encrypted for the duration of the session using a session key specific to the session and based on the application transmitting the content and the sending and receiving users.

The CDS 104 can process all data being sent into the private network on a sequential basis, but responsive to identifying content including the digital signature, the existing content can be diverted to allow priority/immediate transfer of the signed content. As additional content is sent between the sender-receiver during a session, the CDS 104 can hold the fast track communication channel open for the lowest latency rate possible for this content. Ongoing communication between sender and receiver during a session within a threshold amount of time (e.g., 90 seconds). The CDS 104 can filter and scan all transferred content during the session as a single stream of content. This can prevent prohibited content from being forwarded through the CDS processing content piece-meal.

The data packets to be transferred to the private network 106 can be multiplexed via a multiplexer (MUX 116). At the CDS 104, the data can be demultiplexed via demultiplexer (DEMUX 120). The data can be forwarded to a transmitter 122 and a one-way transfer device. The data can be processed via a data validator 124 and scanner 126. In some embodiments, data can be stored in databases 118, 130.

In some embodiments, when large amounts of content are sent to the CDS 104, the CDS 104 may split the data in sequential blocks to maximize speed of throughput for the content. This can increase interactivity experienced by a receiving user to receive portions of content rather than waiting for all content to be received at once.

Once data is received at the CDS 104, the CDS 104 can store the data in a receive buffer. The CDS 104 can create a dynamic storage space (e.g., in receive buffer 132) for each session. The storage can be cleared or archived for audit purposes once the session ends. The storage can be an Object storage for which a bucket is created for each new session. An application (e.g., APP A 112c, APP B 112d) on the private network side can access the storage of the current session if user and application have been successfully authenticated.

The CDS 104 also can maintain an audit trail of transferred content, and the sender and the receiver identities. For example, all content transferred to the private network and all metadata can be logged in an auditing storage module 128 at the CDS for subsequent auditing. An audit element can audit all content and/or validate that data is signed by a genuine trust module private key. In some embodiments, the data can be tracked using a ticketing module 134 in the CDS 104 that can add a ticket to data to identify the data and the session for subsequent auditing.

In order to support streaming of information, metadata can be added to the data packets that that can both be easily analyzed by the CDS and reconstructed as needed. The file can include the metadata attached indicating information such as session, sending user, receiving user, application, and amount of information (or sequence in the case of data chunking). An identifier for the request can be added to the metadata to allow synchronization on the far as well as troubleshooting in the case of a failure. This ID can be used on both sides of the system but may be generated by the system sending information across the air gap, therefore causing the identifier to be unclassified. This is also, with proper customer or contract support, allow limited return codes to come back from the private network to allow failures to be fixed without engaging teams with access to a particular private network.

In some embodiments, the CDS 104 can include a ticketing module 134. The ticketing module 134 can assign tickets to content being forwarded to the private network for tracking of the content during a session. A new ticket can be automatically or manually created with a designated ticket project identifier. The ticket itself can track the reporter, i.e. representing the sending user and may also track the assignee recipient user for subsequent tracking/auditing. The history that can be stored alongside the ticket provide for auditing, even in cases when no explicit assignee (recipient) is marked within the ticket.

In response to receipt of the data packets at the private network 106, a second computing device 110b can execute a second instance of the trust module 114b that can authenticate the data packets and the recipient user 108b. The second computing device 110b can receive the data responsive to authenticating the data and can utilize the data for execution of subsequent actions using applications 112c-d.

Figure 2:
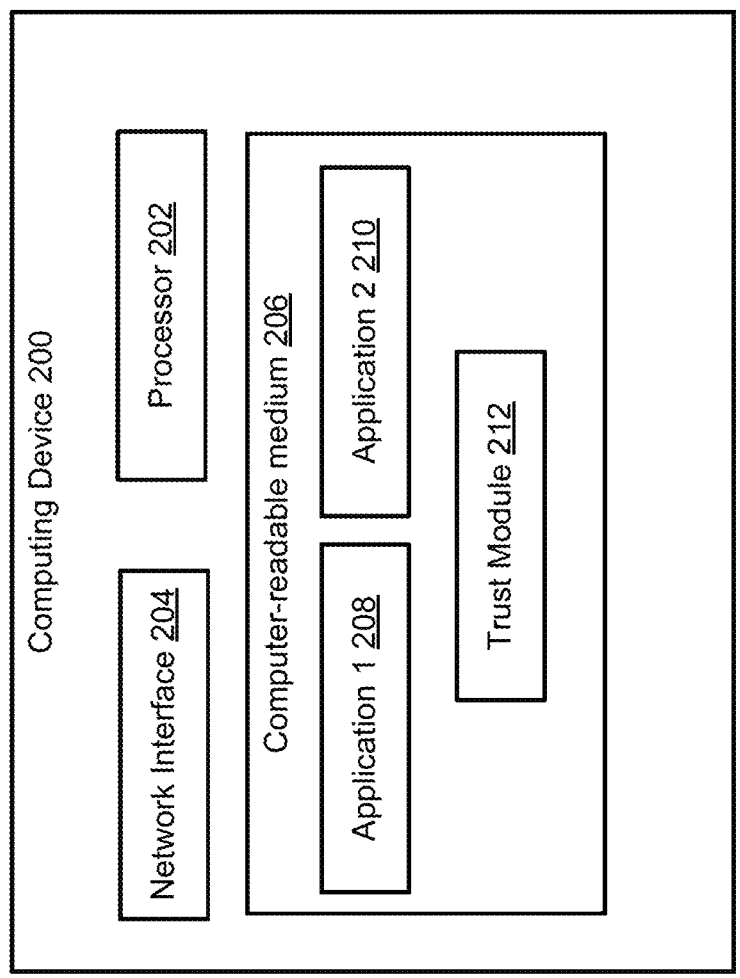
FIG. 2 illustrates a block diagram of an example computing device, according to at least one embodiment.

FIG. 2 illustrates a block diagram of an example computing device 200. The computing device can include a first computing device 110a in the public network 102 or a second computing device 110b in the private network 106 as described with respect to FIGS. 1A-1B, for example.

The computing device can include any of a processor 202, a network interface 204, and a computer readable medium 206. The computer-readable medium 206 can include instructions that, when executed by the processor 202, cause the processor 202 to perform various steps. For example, the processor 202 can perform steps as provided in FIG. 3 as described below.

The computer-readable medium 206 can include instructions to execute any of a number of applications (e.g., application 1 208, application 210). The applications 208, 210 can include chat applications, cloud computing access applications, a command line application, etc. The applications 208, 210 can allow for creation or receipt of content to be forwarded to the private network.

A user can log into an application (e.g., 208) with login credentials specific to the application. The application 208 can forward the login credentials to a trust module 212 using a token for the trust module 212 to validate the user and the application 208. The application 208, 210 can also allow for specifying a recipient user to receive the data packets in the private network. The application can verify user login credentials to establish a trust relationship with the user. The application can process the login credentials to perform authentication of the user using permission systems of the public network. The permission systems can be part of computing device 110 or being federated with other authentication providers. To further strengthen security it may use two factor authentication.

The computer-readable medium 206 can also include instructions to execute a trust module 212. As described above, the trust module 212 can authenticate the user and application generating content. The trust module 212 can add metadata specifying the sending user, recipient user, and the application providing the content. The trust module 212 can also add a digital signature to the content using a private key specific to the trust module.

The trust module can establish a trust relationship with an application in any of the public network and/or private network. The trust module can utilize a mutual authentication procedure to authenticate the application using protocols such as Mutual Transport Layer Security (MTLS) (e.g., where short certificates or shared secret are exchanged at the beginning of a session or alongside each packet). Accordingly, only applications that are registered with the trust module can send packets. Alternatively, packets may be only processed if signed by the application with a trusted application key.

The computing device 200 can also include a network interface 204 for facilitating data communication with various devices in the network environment. For example, the network interface 204 can forward data packets to the CDS to be forwarded to the private network as described herein.

Figure 3:
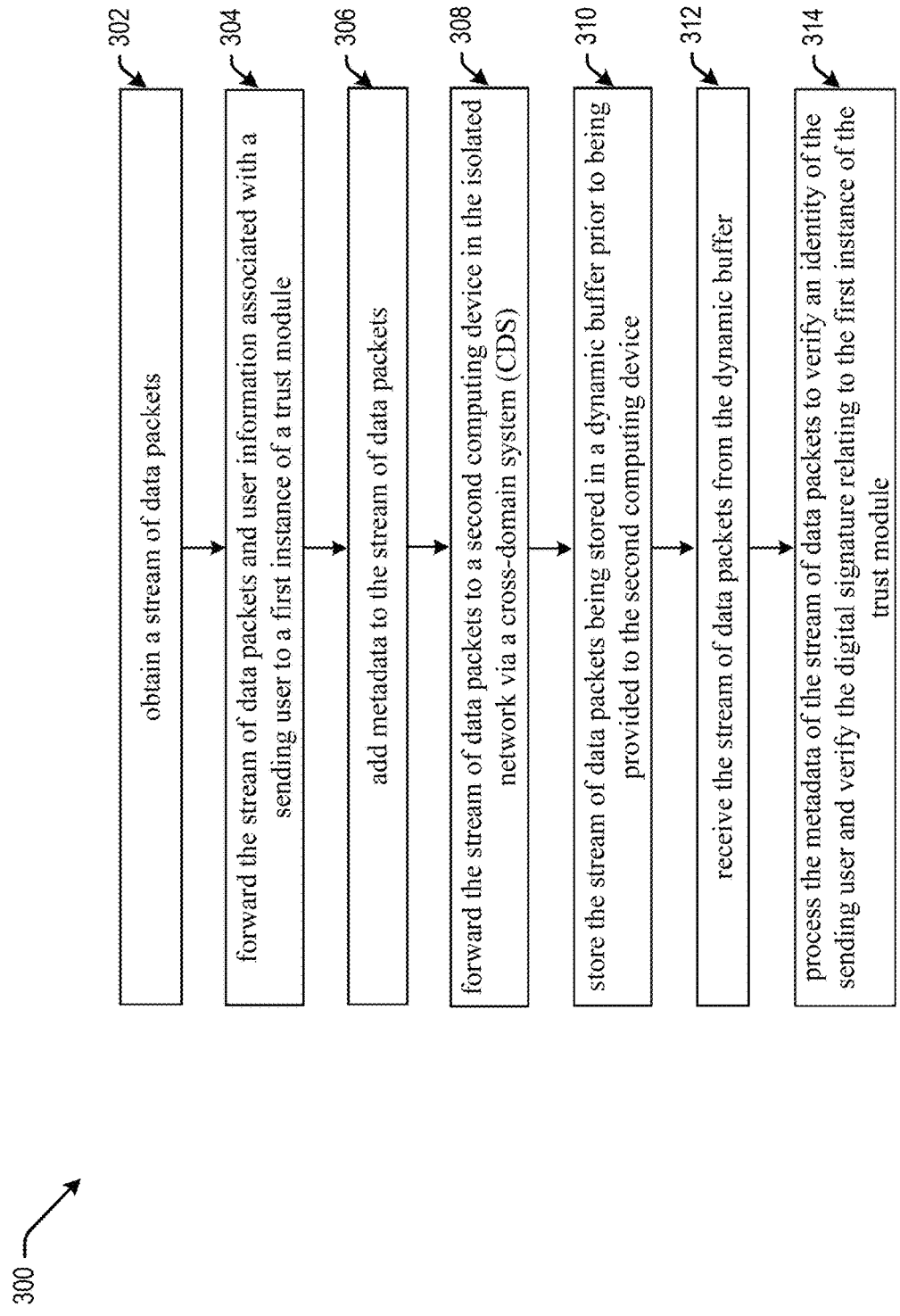
FIG. 3 is a block diagram of a method for secure one-way transmission of data from a public network to a private network, according to at least one embodiment.

FIG. 3 is a block diagram of a method 300 for secure one-way transmission of data from a public network to a private network. At step 302, the method can include obtaining a stream of data packets. The data packets can be received from a first application executing on a first computing device in the public network.

In some embodiments, the stream of data packets are provided to a one-way clipboard allowing content to be written or copied to the one-way clipboard. In other embodiments, a ticket can be assigned to the stream of data packets via a ticketing module of the CDS. The ticket can identify a session between the sending user and the receiving user. In other embodiments, the stream of data packets are sent to the second computing device via the CDS using a one-way chat application.

At step 304, the method can include forwarding the stream of data packets and user information associated with a sending user to a first instance of a trust module executing on the first computing device. The user information can include information identifying the sending user, such as login credentials provided by the user (e.g., via a token provided by an application). The first instance of the trust module can authenticate the sending user and the first application by verifying a token obtained by the first instance of the trust module responsive to the sending user providing the user information to the first application.

At step 306, the method can include adding metadata to the stream of data packets. The first instance of the trust module can add the metadata including a digital signature including a private key specific to the first instance of the trust module and information relating to the user information, the first application, and a recipient user. In some embodiments, the stream of data packets can be converted into a first file type. The stream of data packets may fall below a threshold data size and may be within a set of encoding criteria.

The metadata can be used in auditing data sent during a session between a sending user and a receiving user. The metadata can also be used in routing data packet(s) to proper applications (e.g., a clipboard, ticketing system). The metadata can identify a sending user, a first application executing on a computing device in the public network, a receiving user, a second application executing on a computing device in the private network, a session identifier identifying the session, and/or a digital signature. The metadata can include a file separate from the stream of data packets or comprise a part of the stream of data packets (e.g., a XML, header).

At step 308, the method can include forwarding the stream of data packets to a second computing device in the private network via a cross-domain system (CDS). The first stream of data packets can be stored in a dynamic buffer prior to being provided to the second computing device.

In some embodiments, the stream of data packets are forwarded along a priority communication channel in the CDS. Existing traffic in the CDS can be diverted to a second communication channel responsive to forwarding the stream of data packets to the CDS to increase throughput of transmission of the stream of data packets on the priority communication channel.

In some embodiments, the CDS can validate the digital signature including the private key specific to the first instance of the trust module. The CDS can also log the stream of data packets in an auditing computer for subsequent auditing of all content being transmitted to the private network.

At step 310, the method can include storing the first stream of data packets being store in a dynamic buffer prior to providing the stream of data packets to the second computing device.

At step 312, the method can include receiving the stream of data packets from the dynamic buffer. The second computing device can receive the data packets from the CDS and identify the metadata stored in the dynamic buffer.

At step 314, the method can include processing the metadata of the stream of data packets to verify an identity of the sending user and verify the digital signature relating to the first instance of the trust module. The second computer in the private network can process the metadata as described herein.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 4:
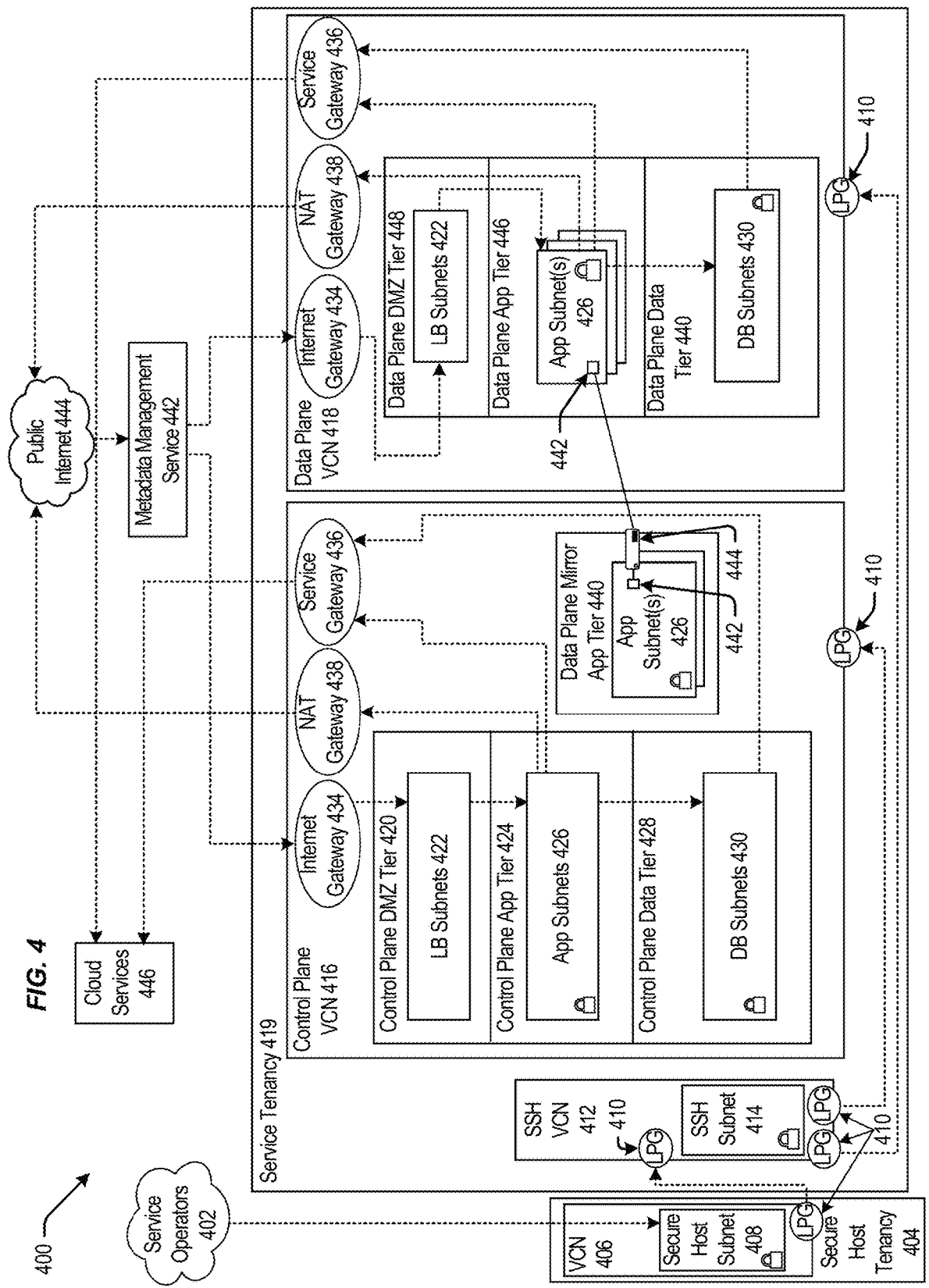
FIG. 4 is a block diagram illustrating one pattern for implementing a cloud infrastructure as a service system, according to at least one embodiment.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively couple to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Memory that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of threat prevention, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

Figure 5:
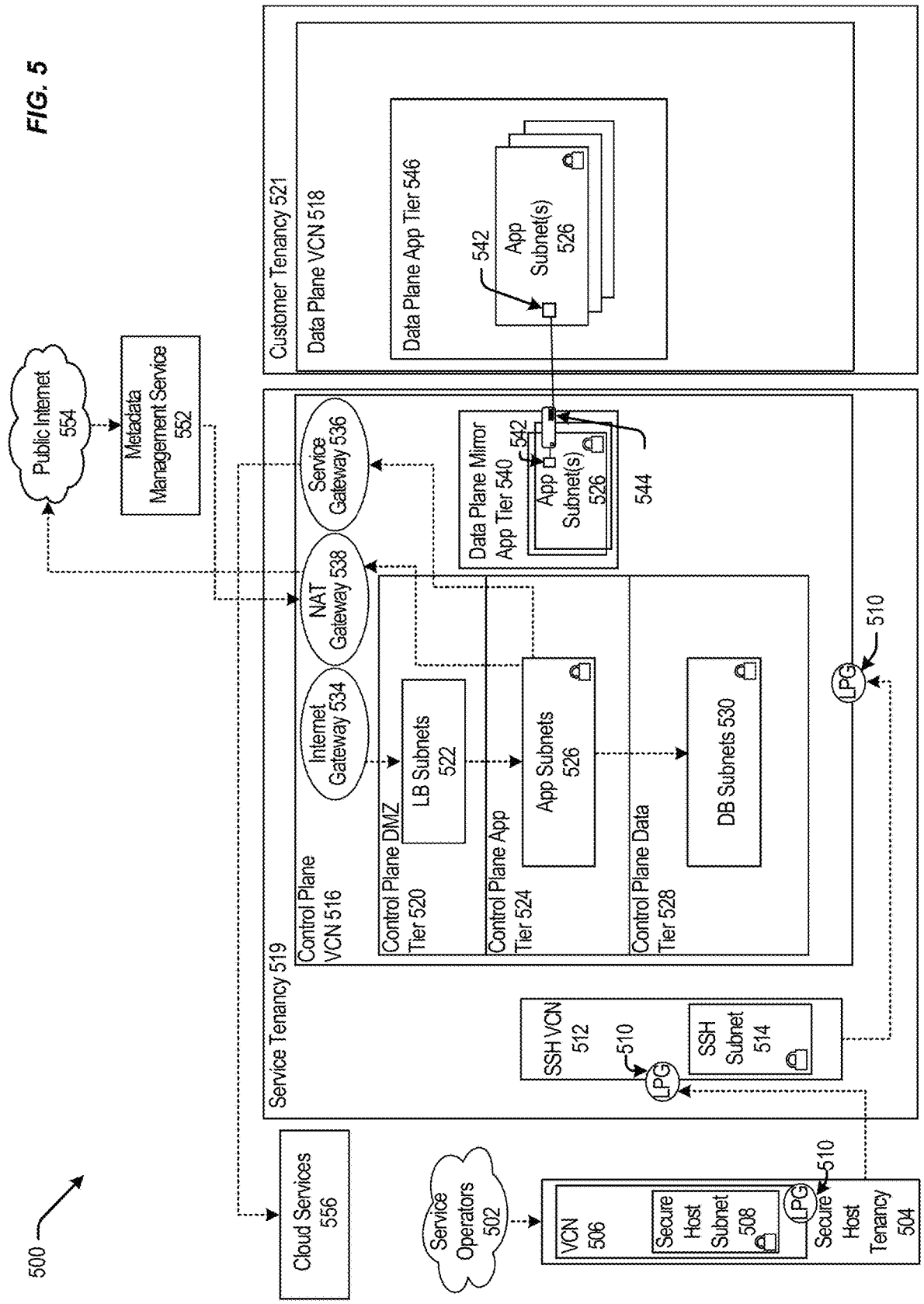
FIG. 5 is a block diagram illustrating another pattern for implementing a cloud infrastructure as a service system, according to at least one embodiment.

FIG. 5 is a block diagram 500 illustrating another example pattern of an IaaS architecture, according to at least one embodiment. Service operators 502 (e.g. service operators 402 of FIG. 4) can be communicatively coupled to a secure host tenancy 504 (e.g. the secure host tenancy 404 of FIG. 4) that can include a virtual cloud network (VCN) 506 (e.g. the VCN 406 of FIG. 4) and a secure host subnet 508 (e.g. the secure host subnet 408 of FIG. 4). The VCN 506 can include a local peering gateway (LPG) 510 (e.g. the LPG 410 of FIG. 4) that can be communicatively coupled to a secure shell (SSH) VCN 512 (e.g. the SSH VCN 412 of FIG. 4) via an LPG 410 contained in the SSH VCN 512. The SSH VCN 512 can include an SSH subnet 514 (e.g. the SSH subnet 414 of FIG. 4), and the SSH VCN 512 can be communicatively coupled to a control plane VCN 516 (e.g. the control plane VCN 416 of FIG. 4) via an LPG 510 contained in the control plane VCN 516. The control plane VCN 516 can be contained in a service tenancy 519 (e.g. the service tenancy 419 of FIG. 4), and the data plane VCN 518 (e.g. the data plane VCN 418 of FIG. 4) can be contained in a customer tenancy 521 that may be owned or operated by users, or customers, of the system.

The control plane VCN 516 can include a control plane DMZ tier 520 (e.g. the control plane DMZ tier 420 of FIG. 4) that can include LB subnet(s) 522 (e.g. LB subnet(s) 422 of FIG. 4), a control plane app tier 524 (e.g. the control plane app tier 424 of FIG. 4) that can include app subnet(s) 526 (e.g. app subnet(s) 426 of FIG. 4), a control plane data tier 528 (e.g. the control plane data tier 428 of FIG. 4) that can include database (DB) subnet(s) 530 (e.g. similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g. the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g. the service gateway of FIG. 4) and a network address translation (NAT) gateway 538 (e.g. the NAT gateway 438 of FIG. 4). The control plane VCN 516 can include the service gateway 536 and the NAT gateway 538.

The control plane VCN 516 can include a data plane mirror app tier 540 (e.g. the data plane mirror app tier 440 of FIG. 4) that can include app subnet(s) 526. The app subnet(s) 526 contained in the data plane mirror app tier 540 can include a virtual network interface controller (VNIC) 542 (e.g. the VNIC of 442) that can execute a compute instance 544 (e.g. similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g. the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g. the metadata management service 452 of FIG. 4) that can be communicatively coupled to public Internet 554 (e.g. public Internet 454 of FIG. 4). Public Internet 554 can be communicatively coupled to the NAT gateway 538 contained in the control plane VCN 516. The service gateway 536 contained in the control plane VCN 516 can be communicatively couple to cloud services 556 (e.g. cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, that are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 4," may be located in Region 1 and in "Region 2." If a call to Deployment 4 is made by the service gateway 536 contained in the control plane VCN 516 located in Region 1, the call may be transmitted to Deployment 4 in Region 1. In this example, the control plane VCN 516, or Deployment 4 in Region 1, may not be communicatively coupled to, or otherwise in communication with, Deployment 4 in Region 2.

Figure 6:
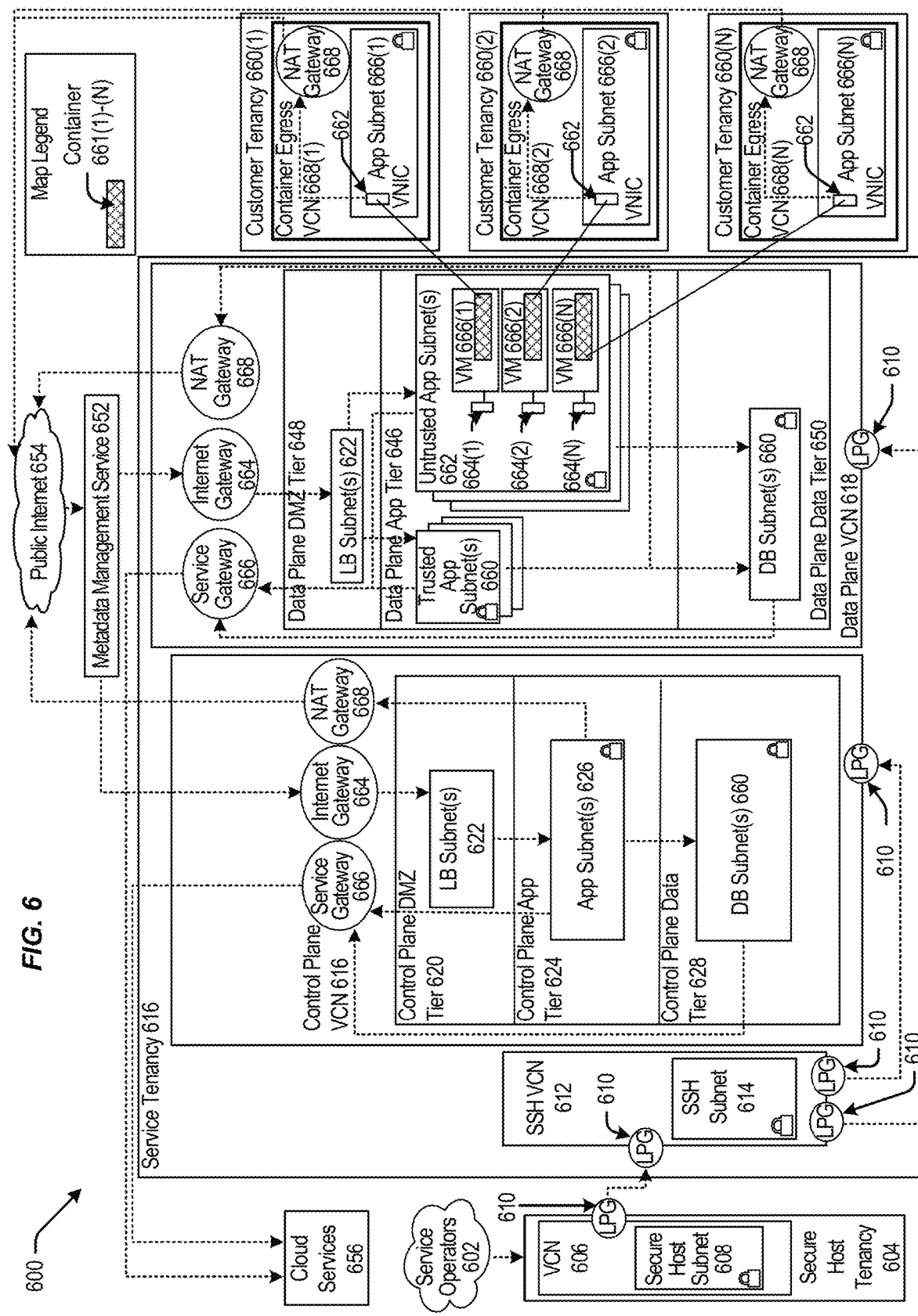
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 402 of FIG. 4) can be communicatively coupled to a secure host tenancy 604 (e.g. the secure host tenancy 404 of FIG. 4) that can include a virtual cloud network (VCN) 606 (e.g. the VCN 406 of FIG. 4) and a secure host subnet 608 (e.g. the secure host subnet 408 of FIG. 4). The VCN 606 can include an LPG 610 (e.g. the LPG 410 of FIG. 4) that can be communicatively coupled to an SSH VCN 612 (e.g. the SSH VCN 412 of FIG. 4) via an LPG 610 contained in the SSH VCN 612. The SSH VCN 612 can include an SSH subnet 614 (e.g. the SSH subnet 414 of FIG. 4), and the SSH VCN 612 can be communicatively coupled to a control plane VCN 616 (e.g. the control plane VCN 416 of FIG. 4) via an LPG 610 contained in the control plane VCN 616 and to a data plane VCN 618 (e.g. the data plane 418 of FIG. 4) via an LPG 610 contained in the data plane VCN 618. The control plane VCN 616 and the data plane VCN 618 can be contained in a service tenancy 619 (e.g. the service tenancy 419 of FIG. 4).

The control plane VCN 616 can include a control plane DMZ tier 620 (e.g. the control plane DMZ tier 420 of FIG. 4) that can include load balancer (LB) subnet(s) 622 (e.g. LB subnet(s) 422 of FIG. 4), a control plane app tier 624 (e.g. the control plane app tier 424 of FIG. 4) that can include app subnet(s) 626 (e.g. similar to app subnet(s) 426 of FIG. 4), a control plane data tier 628 (e.g. the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g. the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g. the service gateway of FIG. 4) and a network address translation (NAT) gateway 638 (e.g. the NAT gateway 438 of FIG. 4). The control plane VCN 616 can include the service gateway 636 and the NAT gateway 638.

The data plane VCN 618 can include a data plane app tier 646 (e.g. the data plane app tier 446 of FIG. 4), a data plane DMZ tier 648 (e.g. the data plane DMZ tier 448 of FIG. 4), and a data plane data tier 650 (e.g. the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g. public Internet 454 of FIG. 4).

The Internet gateway 634 contained in the control plane VCN 616 and contained in the data plane VCN 618 can be communicatively coupled to a metadata management service 652 (e.g. the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively couple to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

Figure 7:
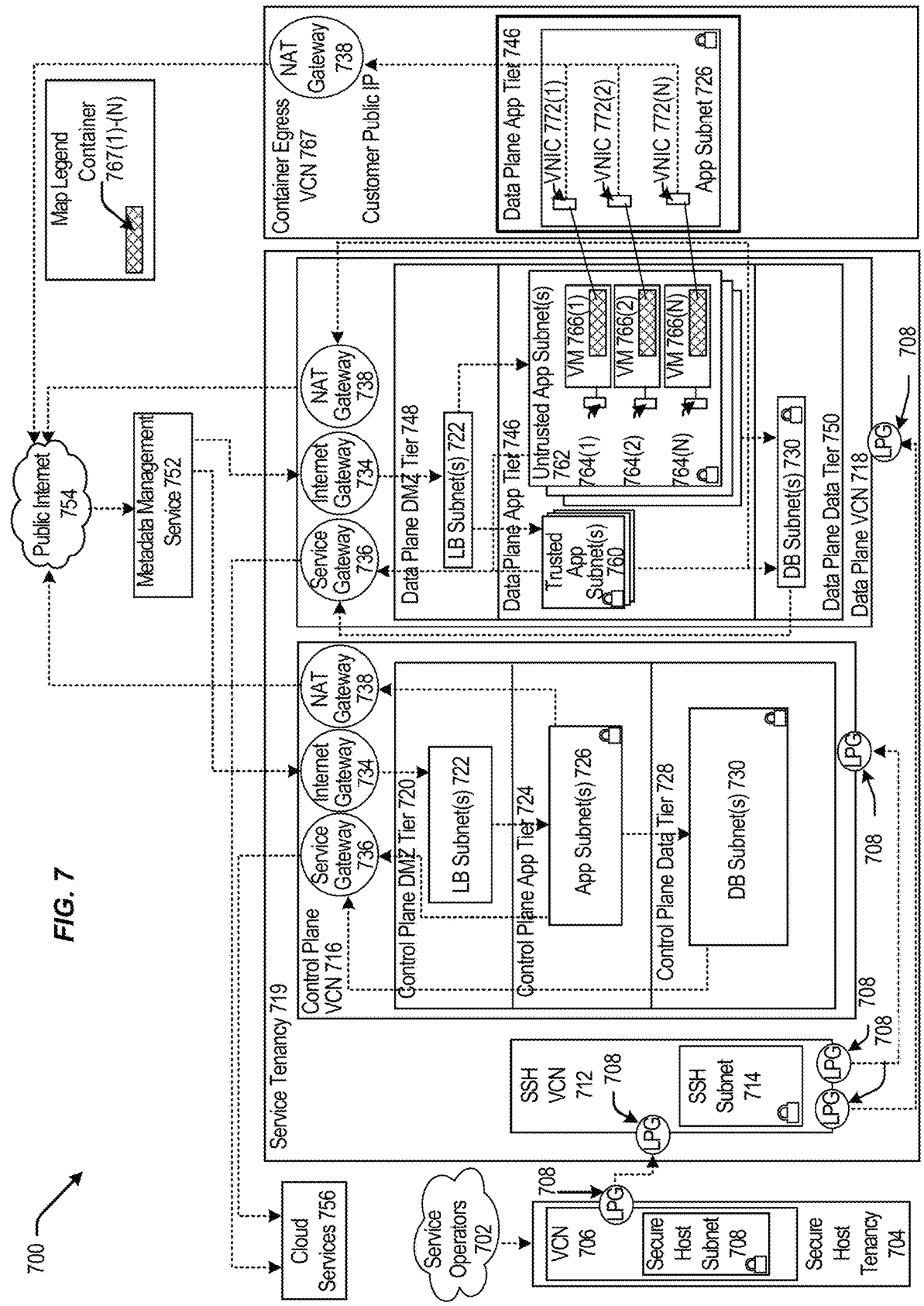
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 402 of FIG. 4) can be communicatively coupled to a secure host tenancy 704 (e.g. the secure host tenancy 404 of FIG. 4) that can include a virtual cloud network (VCN) 706 (e.g. the VCN 406 of FIG. 4) and a secure host subnet 708 (e.g. the secure host subnet 408 of FIG. 4). The VCN 706 can include an LPG 710 (e.g. the LPG 410 of FIG. 4) that can be communicatively coupled to an SSH VCN 712 (e.g. the SSH VCN 412 of FIG. 4) via an LPG 710 contained in the SSH VCN 712. The SSH VCN 712 can include an SSH subnet 714 (e.g. the SSH subnet 414 of FIG. 4), and the SSH VCN 712 can be communicatively coupled to a control plane VCN 716 (e.g. the control plane VCN 416 of FIG. 4) via an LPG 710 contained in the control plane VCN 716 and to a data plane VCN 718 (e.g. the data plane 418 of FIG. 4) via an LPG 710 contained in the data plane VCN 718. The control plane VCN 716 and the data plane VCN 718 can be contained in a service tenancy 719 (e.g. the service tenancy 419 of FIG. 4).

The control plane VCN 716 can include a control plane DMZ tier 720 (e.g. the control plane DMZ tier 420 of FIG. 4) that can include LB subnet(s) 722 (e.g. LB subnet(s) 422 of FIG. 4), a control plane app tier 724 (e.g. the control plane app tier 424 of FIG. 4) that can include app subnet(s) 726 (e.g. app subnet(s) 426 of FIG. 4), a control plane data tier 728 (e.g. the control plane data tier 428 of FIG. 4) that can include DB subnet(s) 730 (e.g. DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g. the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 4) and a network address translation (NAT) gateway 738 (e.g. the NAT gateway 438 of FIG. 4). The control plane VCN 716 can include the service gateway 736 and the NAT gateway 738.

The data plane VCN 718 can include a data plane app tier 746 (e.g. the data plane app tier 446 of FIG. 4), a data plane DMZ tier 748 (e.g. the data plane DMZ tier 448 of FIG. 4), and a data plane data tier 750 (e.g. the data plane data tier 450 of FIG. 4). The data plane DMZ tier 748 can include LB subnet(s) 722 that can be communicatively coupled to trusted app subnet(s) 760 (e.g. trusted app subnet(s) 660 of FIG. 6) and untrusted app subnet(s) 762 (e.g. untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g. public Internet 454 of FIG. 4).

The Internet gateway 734 contained in the control plane VCN 716 and contained in the data plane VCN 718 can be communicatively coupled to a metadata management service 752 (e.g. the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 8:
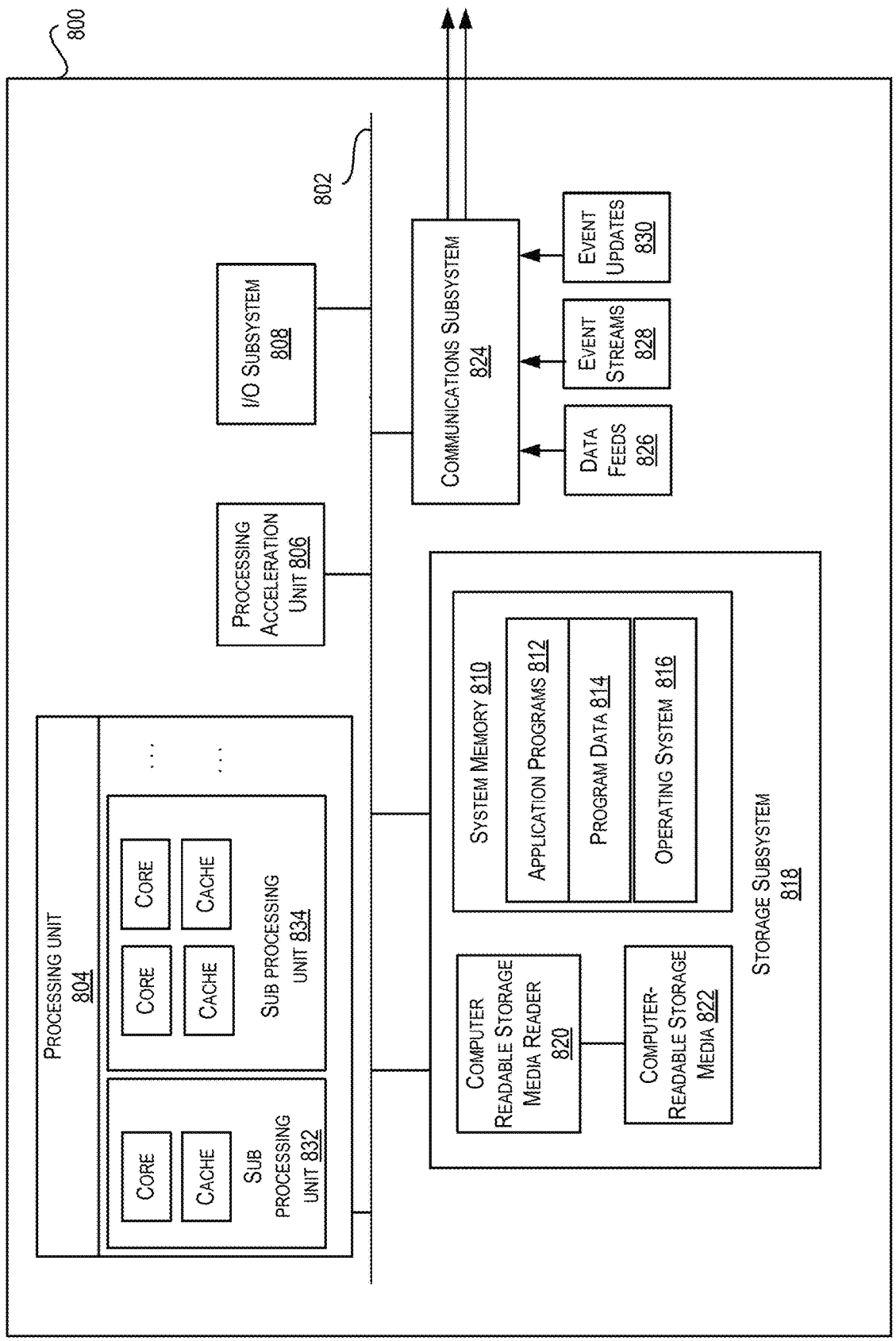
FIG. 8 is a block diagram illustrating an example computer system, according to at least one embodiment.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present disclosure.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method for secure one-way transmission of data from a public network to a private network, the method comprising:

obtaining, at a first computing device in the public network, from a first application, a stream of data packets, information identifying a recepient user, and information identifying a recipient application;

authenticating a sending user and the first application by verifying a token obtained by a first instance of a trust module executing on the first computing device responsive to the sending user providing user information to the first application;

forwarding the stream of data packets and the user information associated with the sending user to the first instance of the trust module executing on the first computing device;

adding metadata to the stream of data packets, the metadata including (a) a digital signature derived from a private key specific to the first instance of the trust module and (b) information relating to the user information; and forwarding the stream of data packets to a second computing device in the private network via a cross-domain system (CDS), the second computing device being configured to process the metadata of the stream of data packets to verify the digital signature relating to the first instance of the trust module based on a public key that corresponds to the private key, where the stream of data packets are forwarded to the recipient application and the recipient user in the private network to consume the metadata.

2. The method of claim 1, wherein the first instance of the trust module is configured to authorize the first application by determining that the stream of data packets is signed with a trusted application key unique to the first application, and wherein a second instance of the trust module in the private network executing on the second computing device is configured to authorize the recipient application by determining that the stream of data packets are signed with a trusted application key unique to the recipient application.

3. The method of claim 1, wherein the first application authenticates the sending user by verifying login credentials provided to the first application that correspond with the sending user.

4. The method of claim 1, wherein the user information comprises login credentials specific to the sending user for logging into the first application.

5. The method of claim 1, wherein the stream of data packets are forwarded along a priority communication channel in the CDS, wherein existing traffic in the CDS is diverted to a second communication channel responsive to forwarding the stream of data packets to the CDS to increase throughput of transmission of the stream of data packets on the priority communication channel.

6. The method of claim 1, further comprising:
converting the stream of data packets into a first file type, wherein the stream of data packets fall below a threshold data size and are within a set of encoding criteria.

7. The method of claim 1, wherein the CDS is configured to:
store the stream of data packets in a dynamic buffer;
validate the digital signature derived from the private key specific to the first instance of the trust module;
log the stream of data packets in an auditing computer for subsequent auditing of content being transmitted to the private network; and
provide the stream of data packets to a receive buffer of the second computing device responsive to the second computing device verifying an identity of the sending user and verifying the digital signature.

8. The method of claim 1, wherein the stream of data packets are provided to a one-way clipboard allowing content to be written or copied to the one-way clipboard.

9. The method of claim 1, wherein the CDS is configured to assign a ticket to the stream of data packets via a ticketing module, the ticket identifying a session between the sending user and the recipient user.

10. The method of claim 1, wherein the stream of data packets are sent to the second computing device via the CDS using a one-way chat application.

11. A system comprising:
a first computing device in a public network, the first computing device including:
a first processor; and
a first computer-readable medium including instructions that, when executed by the first processor, cause the first processor to:
obtain, from a first application executing on the first computing device, a stream of data packets, information identifying a recipient user, and information identifying a recipient application;
authenticate a sending user and the first application by verifying a token obtained by a first instance of a trust module executing on the first computing device responsive to the sending user providing user information to the first application;
pass the stream of data packets to the first instance of the trust module executing on the first computing device;
add, by the first instance of the trust module, metadata to the stream of data packets, the metadata including a digital signature derived from a private key specific to the first instance of the trust module and information relating to the user information provided to the first instance of the trust module, the first application, the sending user, and the recipient user; and
forward the stream of data packets to a second computing device in a private network via a cross-domain system (CDS) providing one-way communication of data from the public network to the private network.

12. The system of claim 11, wherein the second computing device in the private network is configured to:
process, by a second instance of the trust module executing on the second computing device, the metadata of the stream of data packets to verify an identity of the sending user and verify the digital signature relating to the first instance of the trust module; and
receive the stream of data packets at a receiving buffer responsive to verifying the identity of the sending user and verifying the digital signature.

13. The system of claim 11, wherein the first computer-readable medium further causes the first processor to:
split the stream of data packets into a number of portions responsive to the stream of data packets exceeding a threshold data volume, wherein the stream of data packets are forwarded to the CDS in the number of portions.

14. The system of claim 11, wherein the CDS is configured to:
establish a session between the first computing device and the second computing device for secure one-way transmission of data; and
log the stream of data packets and the metadata in an auditing computer for subsequent auditing of content being transmitted to the private network, wherein the auditing computer stores the stream of data packets in a partition of an object storage for the session.

15. The system of claim 11, wherein the stream of data packets are converted into an ASCII file type, wherein the stream of data packets fall below a threshold data size and are within a set of encoding criteria.

16. A non-transitory computer-readable medium including stored thereon a sequence of instructions which, when executed by a processor causes the processor to execute a process, the process comprising:
obtaining, by a first computing device in a public network, from a first application executing on the first computing device, a stream of data packets, information identifying a recipient user, and information a recipient application;
authenticating, by a first instance of a trust module executing on the first computing device, a sending user and the first application by verifying a token obtained by the first instance responsive to the sending user providing user information to the first application;
passing, by the first computing device, the stream of data packets to the first instance of the trust module executing on the first computing device;
adding, by the first instance of the trust module executing on the first computing device, metadata to the stream of data packets;
forwarding, by the first computing device, the stream of data packets to a second computing device in a private network via a cross-domain system (CDS) providing secure one-way communication of the stream of data packets from the public network to the private network, wherein a second computing device is configured to:

process the metadata of the stream of data packets to verify an identity of the sending user and verify a digital signature relating to the first instance of the trust module in the metadata in the stream of data packets; and responsive to verifying the identity of the sending user and verifying the digital signature, receive the stream of data packets in a receive buffer maintained by the second computing device.

17. The non-transitory computer-readable medium of claim 16, where the metadata includes a digital signature derived from a private key specific to the first instance of the trust module and information relating to the user information is provided to the first instance of the trust module, the first application, a sending user, and the recipient user.

18. The non-transitory computer-readable medium of claim 17, wherein the user information comprises login credentials specific to the sending user for logging into the first application.

19. The non-transitory computer-readable medium of claim 16, wherein the stream of data packets are forwarded along a priority communication channel in the CDS, wherein existing traffic in the CDS is diverted to a second communication channel responsive to forwarding the stream of data packets to the CDS to increase throughput of transmission of the stream of data packets on the priority communication channel.

20. The non-transitory computer-readable medium of claim 16, wherein the process further comprises:

splitting the stream of data packets into a number of portions responsive to the stream of data packets exceeding a threshold data volume, wherein the stream of data packets are forwarded to the CDS in the number of portions.

21. A method for secure one-way transmission of data from a public network to a private network, the method comprising:

obtaining, at a first computing device in the public network, from a first application, a stream of data packets, a recipient user, and a recipient application;

forwarding the stream of data packets and user information associated with a sending user to a first instance of a trust module executing on the first computing device;

adding metadata to the stream of data packets, the metadata including a digital signature derived from a private key specific to the first instance of the trust module and information relating to the user information; and forwarding the stream of data packets to a second computing device in the private network via a cross-domain system (CDS), the second computing device being configured to process the metadata of the stream of data packets to verify the digital signature relating to the first instance of the trust module based on a public key that corresponds to the private key, where the stream of data packets are forwarded to the recipient application and the recipient user in the private network to consume the metadata, wherein the first instance of the trust module is configured to authorize the first application by determining that the stream of data packets is signed with a trusted application key unique to the first application, and wherein a second instance of the trust module in the private network executing on the second computing device is configured to authorize the recipient application by determining that the stream of data packets are signed with a trusted application key unique to the recipient application.

22. A method for secure one-way transmission of data from a public network to a private network, the method comprising:

obtaining, at a first computing device in the public network, from a first application, a stream of data packets, a receipt user, and a recipient application;

forwarding the stream of data packets and user information associated with a sending user to a first instance of a trust module executing on the first computing device;

adding metadata to the stream of data packets, the metadata including a digital signature derived from a private key specific to the first instance of the trust module and information relating to the user information; and forwarding the stream of data packets to a second computing device in the private network via a cross-domain system (CDS), the second computing device being configured to process the metadata of the stream of data packets to verify the digital signature relating to the first instance of the trust module based on a public key that corresponds to the private key, where the stream of data packets are forwarded to the recipient application and the recipient user in the private network to consume the data, and wherein the CDS is configured to assign a ticket to the stream of data packets via a ticketing module, the ticket identifying a session between the sending user and the recipient user.

* * * * *

UNITED STATES PATENT AND TRADEMARK OFFICE
CERTIFICATE OF CORRECTION

| | |
|---|---|
| PATENT NO. | : 11,683,299 B2 |
| APPLICATION NO. | : 17/195466 |
| DATED | : June 20, 2023 |
| INVENTOR(S) | : Kuehnel et al. |

It is certified that error appears in the above-identified patent and that said Letters Patent is hereby corrected as shown below:

In the Specification

In Column 8, Line 25, Delete "that that" and insert -- that --.

In the Claims

In Column 26, Lines 37-38, In Claim 1, delete "network," and insert -- network --.

In Column 26, Line 39, In Claim 1, delete "recepient" and insert -- recipient --.

In Column 30, Line 27, In Claim 22, delete "receipt" and insert -- recipient --.

Signed and Sealed this
Second Day of April, 2024

*Katherine Kelly Vidal*

Katherine Kelly Vidal
*Director of the United States Patent and Trademark Office*